US012469636B2

(12) United States Patent
Krainer et al.

(10) Patent No.: US 12,469,636 B2
(45) Date of Patent: Nov. 11, 2025

(54) TAP CHANGER ARRANGEMENT AND A TRANSFORMER ARRANGEMENT COMPRISING THE TAP CHANGER ARRANGEMENT

(71) Applicant: Hitachi Energy Ltd, Zürich (CH)

(72) Inventors: Per Krainer, Borlänge (SE); Christer Arnborg, Gävle (SE); Jean Louis Gérard Mathae, Ludvika (SE); Daniel Forsman, Elverum (NO)

(73) Assignee: HITACHI ENERGY LTD, Zürich (CH)

( * ) Notice: Subject to any disclaimer, the term of this patent is extended or adjusted under 35 U.S.C. 154(b) by 0 days.

(21) Appl. No.: 18/880,424

(22) PCT Filed: Jul. 19, 2023

(86) PCT No.: PCT/EP2023/070007
§ 371 (c)(1),
(2) Date: Dec. 31, 2024

(87) PCT Pub. No.: WO2024/017943
PCT Pub. Date: Jan. 25, 2024

(65) Prior Publication Data
US 2025/0166886 A1 May 22, 2025

(30) Foreign Application Priority Data
Jul. 22, 2022 (EP) .................................... 22186495

(51) Int. Cl.
*H01F 29/02* (2006.01)

(52) U.S. Cl.
CPC .................................. *H01F 29/025* (2013.01)

(58) Field of Classification Search
CPC ........ H01F 27/025; H01F 27/04; H01F 27/06; H01F 27/29; H01F 29/00; H01F 29/02; H01F 29/025; H01F 29/04
See application file for complete search history.

(56) References Cited

U.S. PATENT DOCUMENTS 3,195,082 A * 7/1965 Wetherill .............. H01F 37/005 336/84 R
4,464,644 A * 8/1984 Fukatsu .................. H01F 27/02 336/100
(Continued)

FOREIGN PATENT DOCUMENTS

DE 2640807 A1 4/1977
EP 3761332 A1 1/2021
(Continued)

OTHER PUBLICATIONS

International Search Report and Written Opinion of the International Searching Authority, International Application No. PCT/EP2023/070007, mailed Sep. 20, 2023, 12 pages.
(Continued)

*Primary Examiner* — Mang Tin Bik Lian
(74) *Attorney, Agent, or Firm* — Sage Patent Group

(57) ABSTRACT

A tap changer arrangement including a tap changer housing having a longitudinal extension along a first axis, wherein the tap changer housing comprises a first interface part fixedly attachable to a support structure of a transformer tank, a second interface part at a distal part of the tap changer housing, and an intermediate housing part arranged between the first interface part and the second interface part, the first interface part, the intermediate housing part and the second interface part being arranged on the first axis. The tap changer arrangement includes a plurality of support elements that is mechanically connected to the second interface part and either mechanically connected to the first interface
(Continued)

part or to a support structure of the transformer tank, the support elements being configured to exert a compressive force on the intermediate housing part from the first interface part and from the second interface part.

13 Claims, 4 Drawing Sheets

(56) References Cited

U.S. PATENT DOCUMENTS

| | | | | |
|---|---|---|---|---|
| 2005/0099741 | A1* | 5/2005 | Stenestam | G01R 31/333<br>361/1 |
| 2012/0112730 | A1* | 5/2012 | Brueckl | H01H 9/0044<br>323/343 |
| 2016/0351356 | A1 | 12/2016 | Reich et al. | |
| 2021/0025939 | A1* | 1/2021 | Saveliev | G01R 31/3274 |

FOREIGN PATENT DOCUMENTS

| | | | |
|---|---|---|---|
| KR | 20080114698 | A | 12/2008 |
| KR | 20230047220 | A | 4/2023 |
| KR | 20230048567 | A | 4/2023 |

OTHER PUBLICATIONS

International Preliminary Report on Patentability, International Application No. PCT/EP2023/070007, mailed Jul. 1, 2024, 10 pages.
Korean Decision to Grant and English Translation, Korean Application No. 8700-220069US01, mailed Aug. 28, 2025, 6 pages.

* cited by examiner

TAP CHANGER ARRANGEMENT AND A TRANSFORMER ARRANGEMENT COMPRISING THE TAP CHANGER ARRANGEMENT

CROSS REFERENCE TO RELATED APPLICATIONS

This application is a 35 U.S.C. § 371 national stage application of PCT International Application No. PCT/EP2023/070007 filed on Jul. 19, 2023, which in turns claims foreign priority to European Patent Application No. 22186495.2, filed on Jul. 22, 2022, the disclosures and content of which are incorporated by reference herein in their entirety.

TECHNICAL FIELD

The present disclosure relates to the field of tap changers for transformer applications. In particular, the disclosure relates to the handling of forces affecting the tap changer in moving environments.

BACKGROUND

Power transformers are used in electric grids of power systems. Power transformers transform voltage and current in order to transport and distribute electric energy. Tap-changers may be used to change the turn ratio between windings in transformers. The turn ratio determines the voltage ratio between the windings and is essential for the stabilization of network voltage under variable load conditions.

When transformers are used in environments where unintentional movement and oscillations may occur, such as on floating platforms at sea, and on land in areas of increased seismic activity, i.e., where earthquakes are likely, the mechanical construction and design of transformers and tap changers must be adapted to withstand such unintentional movement and oscillations.

An in-tank tap changer is a tap changer that is located inside a transformer tank. In-tank tap changers are normally only fixed with respect to a transformer tank cover, which is adequate if there are no oscillating/repeating accelerations present. However, continuous alternating accelerations, especially in the horizontal plane, could cause fatigue in different parts of such a fixing mechanism. There is therefore a need for a construction that will enable a tap changer to sustain repetitive changes in its horizontal acceleration.

SUMMARY

An object of the disclosure is to provide an improved tap changer arrangement. More specifically, an object of the disclosure is to provide a tap changer arrangement which is able to withstand displacing and/or oscillating forces, especially horizontal forces, acting on the tap changer arrangement. Another object of the disclosure is to provide a transformer arrangement comprising such a tap changer arrangement.

According to a first aspect of the present disclosure, the object is at least partly achieved by a tap changer arrangement.

Hence, there is provided a tap changer arrangement comprising a tap changer housing having a longitudinal extension along a first axis. The tap changer housing comprises a first interface part, at a proximal part of the tap changer housing, fixedly attachable to a support structure of a transformer tank, a second interface part at a distal part of the tap changer housing, and an intermediate housing part arranged between the first interface part and the second interface part. The first interface part, the intermediate housing part and the second interface part being arranged on the first axis. The tap changer housing is arranged to be suspended from a support structure of a transformer tank by the first interface part of the tap changer housing. The tap changer arrangement comprises a plurality of support elements, each having a longitudinal extension along a respective support element axis, wherein the plurality of support elements is mechanically connected to the second interface part and either mechanically connected to the first interface part or arranged to be mechanically connected to a support structure of the transformer tank. The plurality of support elements is arranged to exert a compressive force on the intermediate housing part from the first interface part and from the second interface part such that the intermediate housing part is pre-tensioned between the first interface part and the second interface part.

A part being proximal to another part is herein defined as the part being arranged to be closer to a support structure of a transformer tank, when mounted in the transformer tank, in relation to the other part. A part being distal to another part is herein defined as the part being farther away from the support structure of the transformer tank, when mounted in the transformer tank, than the other part.

The tap changer arrangement of the present disclosure is intended for use in applications in which it subjected to a displacing and/or an oscillating force. However, in still conditions and when mounted in a transformer tank, the first axis is to be understood as a vertical axis.

The support elements may be configured to be mechanically connected to either the first interface part or configured to be mechanically connected to a support structure of the transformer tank at the proximal ends of the support elements. A distal end of the support elements may be configured to be mechanically connected to the second interface part.

The support elements may be distinct elements, separate from the intermediate housing part. As such, the support elements may be mechanically connected to the second interface part and to either the first interface part, or to the support structure, during installation or assembly of the tap changer arrangement. The support elements may be configured to indirectly exert the compressive force on the intermediate housing part by being mechanically connected to the second interface part and to either the first interface part, or to the support structure.

A proximal end of the intermediate housing part is fixedly attached to the first interface part at a proximal housing connection and a distal end of the intermediate housing part is fixedly attached to the second interface part at a distal housing connection. The compressive force exerted on the intermediate housing part by the support elements pretensions the intermediate housing part between the first interface part and the second interface part. Thereby, the proximal housing connection is relieved of the weight of the intermediate housing part and the weight of the second interface part. Instead, the weight is arranged to be supported by the support structure, either where the support structure is mechanically connected to the support elements or where the first interface part is arranged to be fixed to the support structure. The bending movement of the tap changer housing, resulting from horizontal forces, is thereby reduced because tensile stress is eliminated or reduced by the pre-tensioning of the intermediate housing part.

Optionally, at least one support element is arranged to be inclined relative to the first axis by a first angle between the first axis and the support element axis, wherein the first angle is between −45 degrees and 45 degrees, preferably between −30 degrees and 30 degrees, and most preferably between −15 degrees and 15 degrees.

The support elements may be arranged around the first axis of the tap changer housing and may be arranged to be inclined by the first angle. The first angle is less than 45 degrees such that a major part of the force exerted by the support elements on the intermediate housing part is a compressive force, i.e., a pre-tensioning force. The inclination of the support elements further stabilizes the intermediate housing in a direction perpendicular to the first axis. In addition, a first angle of less than 45 degrees provides a small, space-saving footprint for the tap changer arrangement when mounted in a transformer tank. It is to be understood that not all support elements of the plurality of support elements need necessarily be arranged at a first angle of zero degrees.

Optionally, the support elements comprise a mechanical tensioning mechanism such that the support elements exert the compressive force on the intermediate housing part when mechanically connected to the tap changer housing.

At assembly of the tap changer arrangement, the support elements may be mechanically connected to the second interface part and to the first interface part or the support elements may be arranged to be mechanically connected to the support structure of the transformer tank and thereafter tensioned, thereby providing the compressive force exerted on the intermediate housing part, i.e., the pre-tensioning of the intermediate housing part. The support elements may be drawbars. The drawbars may be assisted by biasing elements.

Optionally, the support elements each have a distal end comprising a distal connecting part and a proximal end comprising a proximal connecting part. The distal connecting part and/or the proximal connecting part may comprise a biasing element arranged to exert the compressive force on the intermediate housing part, or an additional compressive force on the intermediate housing part.

Such biasing elements may be the only elements providing the compressive force, i.e., the pre-tensioning of the intermediate housing part. Alternatively, the biasing elements may complement the compressive force provided by the mechanical tensioning mechanism of the support elements as described above. The biasing elements may be coil springs.

Optionally, each of the support elements comprises an intermediate electrically insulating part, arranged between the distal connecting part and the proximal connecting part.

In a tap changer housing, there may be a significant difference in electric potential between the first interface part and the second interface part. An intermediate electrically insulating part of the support elements therefore prevents short-circuiting of the tap changer housing via the support elements.

Optionally, the distal connecting part comprises an articulated connection mechanically connected to the second interface part and/or the proximal connecting part comprises an articulated connection mechanically connected to either the first interface part or arranged to be mechanically connected to the support structure of the transformer tank.

An articulated connection allows a degree of rotational movement around a point of connection. Thereby, bending stress on the support elements at the proximal connecting part and at the distal connecting part is eliminated or reduced. The articulated connection may for instance be a ball joint.

Optionally, at least one support element is further arranged to be inclined relative to a plane by a second angle between the plane and the support element axis, which plane comprises the first axis and the distal connecting part of said at least one support element, and wherein the second angle is between −45 degrees and 45 degrees, preferably between −30 degrees and 30 degrees, and most preferably between −15 degrees and 15 degrees.

The second angle stabilizes the tap changer housing and prevents or reduces rotational movement of the tap changer housing around the first axis. The second angle of one support element may be complemented by the second angle of another support element such that one support element hinders rotation around the first axis in one direction and the other support element hinders rotation around the first axis in the other direction.

Optionally, the first interface part and the second interface part each comprises a flange, and the intermediate housing part comprises an electrically insulating housing part.

The electrically insulating housing part may be prone to cracking when exposed to bending movement and tensile stress in a moving or oscillating environment. The elimination or reduction of tensile stress on the intermediate housing part is therefore a particularly advantageous feature of the present disclosure.

According to a second aspect of the present disclosure, the object is at least partly achieved by transformer arrangement.

Hence, there is provided a transformer arrangement comprising a transformer tank, a support structure, a transformer and the tap changer arrangement according to any one of the embodiments of the first aspect of the present disclosure. The support structure may comprise at least a part of the transformer tank enclosing the transformer and the tap changer arrangement. The support structure may comprise a transformer tank cover.

The transformer tank may be filled with insulating fluid. The transformer comprises a plurality of windings, such as primary and secondary windings, positioned on a floor space of the transformer tank. The tap changer arrangement according to the first aspect of the present disclosure may be suspended from a top of the transformer tank, i.e., from a transformer tank cover.

BRIEF DESCRIPTION OF THE DRAWINGS

Further objects and advantages of, and features of, the disclosure will be apparent from the following description of one or more embodiments, with reference to the appended drawings, where.

DETAILED DESCRIPTION

The present disclosure is developed in more detail below referring to the appended drawings which show examples of embodiments. The disclosure should not be viewed as limited to the described examples of embodiments. Like numbers refer to like elements throughout the description.

Figure 1:
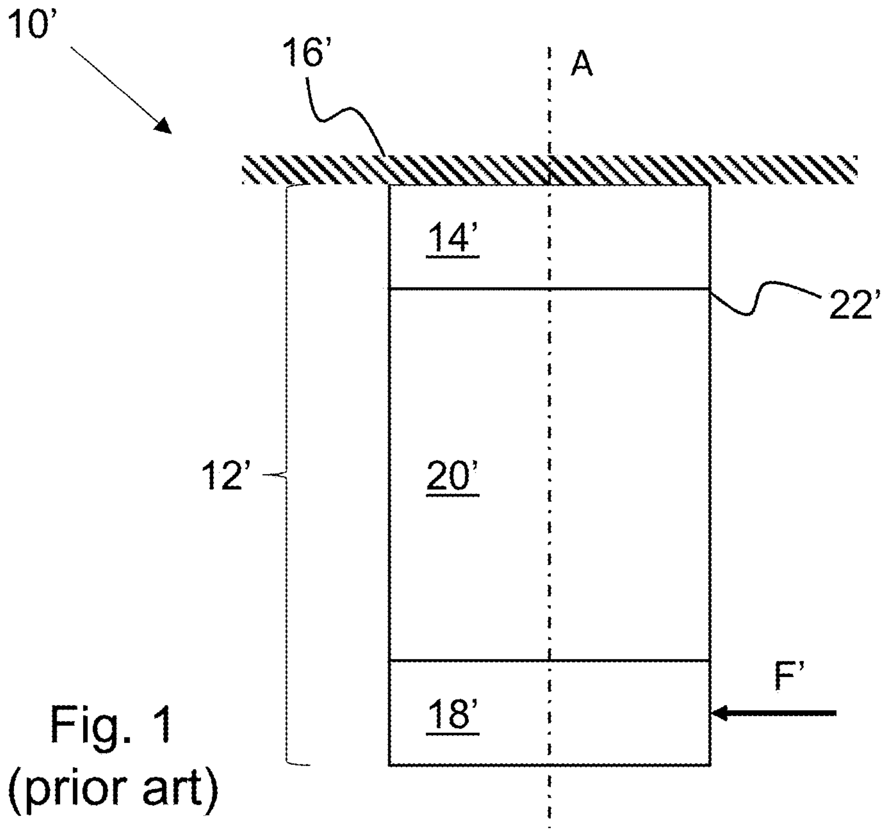
Fig. 1 (prior art)
FIG. 1 is a side view of a prior art tap changer arrangement.

FIG. 1 shows a prior art tap changer arrangement 10' comprising a tap changer housing 12' having a longitudinal extension along a first axis A. The tap changer housing 12' comprises a first interface part 14', at a proximal part of the tap changer housing 12', fixedly attachable to a support structure 16' of a transformer tank (not shown). The prior art tap changer housing 12' further comprises a second interface part 18' at a distal part of the tap changer housing 12', and an intermediate housing part 20' arranged between the first interface part 14' and the second interface part 18'. The first interface part 14', the intermediate housing part 20' and the second interface part 18' are arranged on the first axis A. The tap changer housing 12' is arranged to be suspended from a support structure 16' of a transformer tank (not shown) by the first interface part 14' of the tap changer housing 16'.

When such a prior art tap changer arrangement 10' is mounted in a transformer tank (whereby the position of the transformer tank is indicated by the support structure 16') in an environment which causes the transformer tank to move in a direction perpendicular to the first axis A, harmful bending movements may arise in the tap changer housing 12'. The intermediate housing part 20' often comprises an electrically insulating housing which is fixedly attached to the first interface part 14' by a proximal end of the intermediate housing part 20', herein referred to as a proximal housing connection 22'. The electrically insulating material of the intermediate housing part 20' is rigid and inflexible and prone to cracking under tensile stress. The proximal housing connection 22' carries the weight of the intermediate housing part 20' and the second interface part 18' and is exposed to tensile stress caused by inertia of the tap changer housing 12' during movement of the transformer tank in a direction perpendicular to the first axis A. The inertia is indicated by the arrow F', which also indicates the bending movements.

Figure 2:
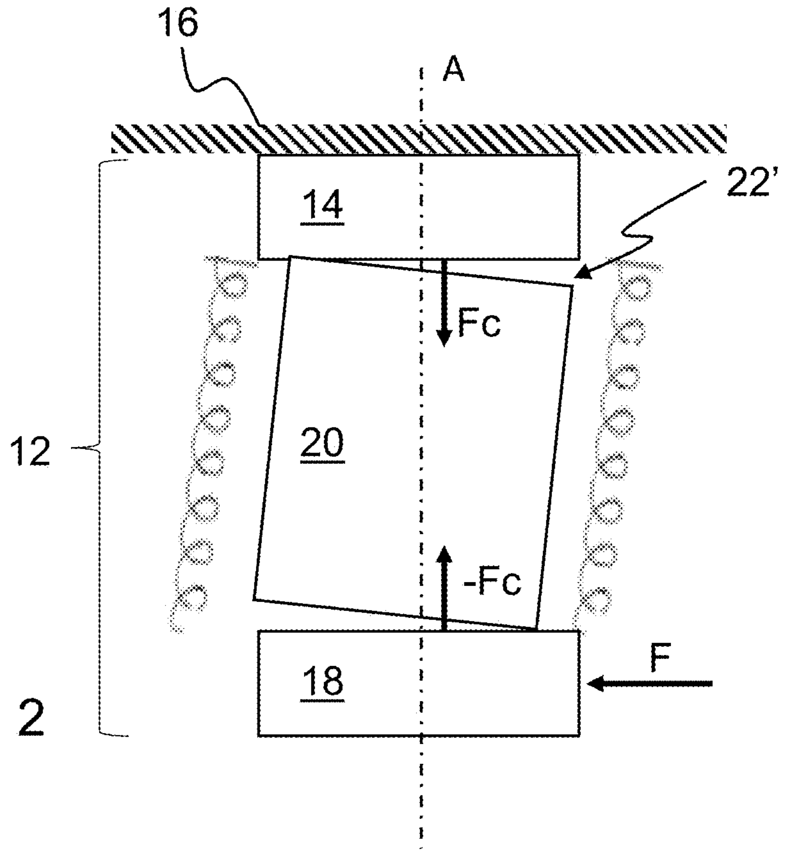
FIG. 2 is a side view illustration of the concept of the present disclosure.

FIG. 2 illustrates a main concept of the present disclosure. The tap changer housing 12 according to the present disclosure comprises similar parts as the prior art tap changer housing 12'. A compressive force may be exerted on the intermediate housing part 20 from the first interface part 14 and from the second interface part 18, shown as arrows Fc and −Fc and illustrated by spring symbols, such that the intermediate housing part 20 is pre-tensioned between the first interface part 14 and the second interface part 18. Thereby, the fragile proximal housing connection 22 is relieved of the weight of the intermediate housing part 20 and the weight of the second interface part 18. Instead, the weight is arranged to be supported by the support structure 16 which is more robust, either where the support structure 16 is mechanically connected to the support elements or where the first interface part 14 is arranged to be fixed to the support structure 16. Consequently, bending movement of the tap changer housing 12, resulting from horizontal forces, is reduced because tensile stress at the proximal housing connection 22 is eliminated or reduced by the pre-tensioning of the intermediate housing part 20. The intermediate housing part 20 is illustrated in a tilted position in FIG. 2 to indicate the bending movement that is counteracted by the pre-tensioning of the intermediate housing part 20.

Figure 3:
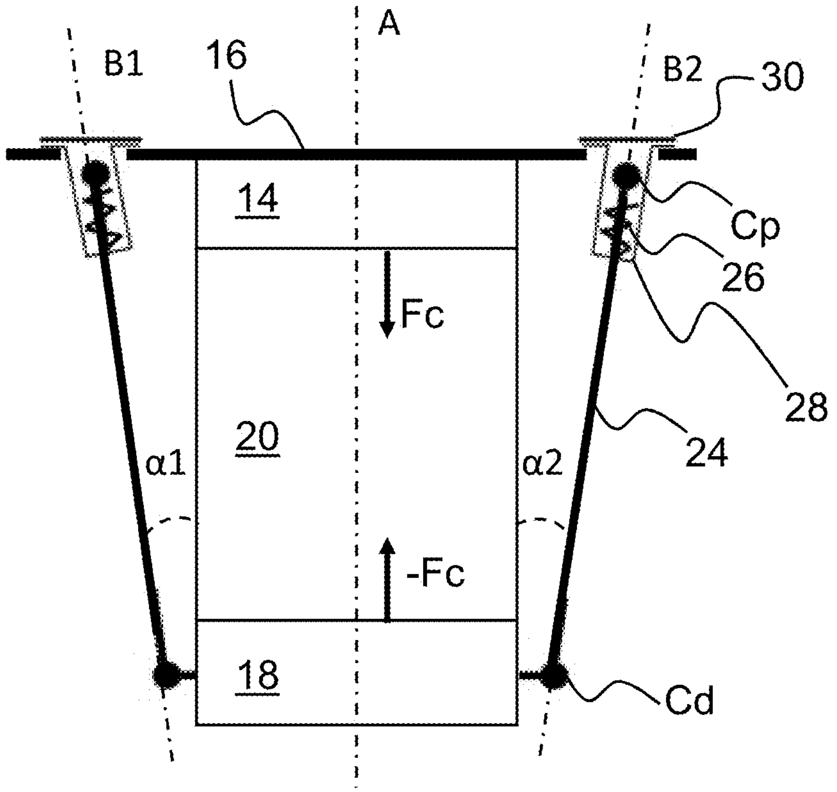
FIG. 3 is a side view of a first example embodiment of the first aspect of the present disclosure.
Figure 4:
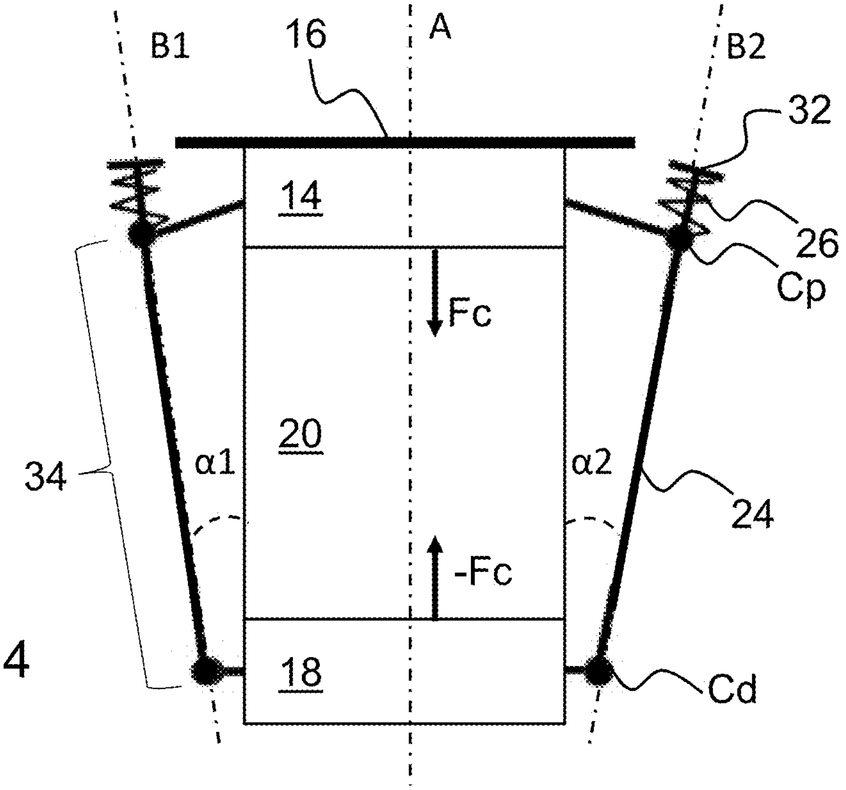
FIG. 4 is a side view of a second example embodiment of the first aspect of the present disclosure.

To this end, the tap changer arrangement 12 according to the first aspect of the present disclosure, exemplified in FIGS. 3 and 4, comprises a plurality of support elements 24, each having a longitudinal extension along a respective support element axis (B1, . . . Bn). Two support elements 24 and two support element axes B1, B2 are shown in FIGS. 3 and 4. At least four support elements 24 may be advantageous in practice. The support elements 24 are mechanically connected to the second interface part 18 and also either mechanically connected to the first interface part 14 (FIG. 4) or arranged to be mechanically connected to a support structure 16 of a transformer tank (not shown). The support elements 24 are configured to exert a compressive force ±Fc on the intermediate housing part 20 from the first interface part 14 and from the second interface part 18 such that the intermediate housing part 20 is pre-tensioned between the first interface part 14 and the second interface part 18.

The support elements 24 may be distinct elements, separate from the intermediate housing part 20. As such, the support elements 24 may be mechanically connected to the second interface part 18 and to either the first interface part 14, or to the support structure 16, during installation or assembly of the tap changer arrangement 10. The support elements 24 may be configured to indirectly exert the compressive force ±Fc on the intermediate housing part 20 by being mechanically connected to the second interface part 18 and to either the first interface part 14, or to the support structure 16.

At least one support element 24 is arranged to be inclined relative to the first axis A by a first angle $\alpha 1, \ldots \alpha n$ between the first axis A and the support element axis B1, . . . Bn. The first angle $\alpha 1, \ldots \alpha n$ may be between −45 degrees and 45 degrees, preferably between −30 degrees and 30 degrees, and most preferably between −15 degrees and 15 degrees. The support elements 24 may be arranged around the first axis A of the tap changer housing 12 and may be arranged to be inclined by the first angle $\alpha 1, \ldots \alpha n$. The first angle $\alpha 1, \ldots \alpha n$ is less than 45 degrees such that a force component exerted in parallel with the first axis A is larger than a perpendicular force component (not shown) exerted in a direction away from the first axis A. The inclination of the support elements 24 further stabilizes the intermediate housing in a direction perpendicular to the first axis A. In addition, a first angle of less than 45 degrees provides a small, space-saving footprint for the tap changer arrangement 10 when mounted in a transformer tank (not shown). Support elements 24 extending away from the tap changer housing 12 may be difficult to fit inside the restricted space of a transformer tank.

The support elements 24 may comprise a mechanical tensioning mechanism such that the support elements 24 exert the compressive force on the intermediate housing part 20 when mechanically connected to the tap changer housing 12.

At assembly of the tap changer arrangement 10, the support elements 24 may be arranged to be mechanically connected to the second interface part 18 and to the first interface part 14 or the support elements 24 may be arranged to be mechanically connected to the support structure 16 of the transformer tank (not shown). The support element may thereafter be tensioned, thereby providing the pre-tensioning of the intermediate housing part 20. The support members 24 may for instance be drawbars, The drawbars may be shortened along the support element axis B1, . . . Bn via a threaded action of relatively movable parts of each support member 24.

In the illustrated embodiment, the support elements 24 each have a distal end comprising a distal connecting part Cd and a proximal end comprising a proximal connecting part Cp. The distal connecting part Cd and/or the proximal connecting part Cp may comprise a biasing element 26 arranged to exert the compressive force ±Fc on the intermediate housing part 20. In the case of pre-tensioning the intermediate housing part 20 via the tensioning mechanism of the support elements 24 themselves, the biasing element 26 may assist the support element 24 and provide an additional compressive force on the intermediate housing part 20. The biasing element 26 may be a coil spring 26.

As shown in FIG. 3, when the support element 24 is arranged to be mechanically connected to a support element 16 of a transformer tank, a spring housing 28 may be arranged to enclose the proximal connecting part Cp such that a spring housing flange 30 of the spring housing 28 engages the support element 16 and the biasing element 26 is pre-tensioned between a distal part of the spring housing 28 and the proximal connecting part Cp. The support member may be movable along the support element axis B1, . . . Bn in relation to the spring housing 28 such that pre-tensioning of the biasing element 26 in the spring housing 28 pulls the support element in the proximal direction along the support element axis B1, . . . Bn, thereby exerting the compressive force on the intermediate housing part 20.

When the support element 24 is mechanically connected to the first interface part 14 as shown in FIG. 4, the biasing element 26 may be pre-tensioned between a biasing element support member 32, at a proximal tip of the support element 24, and the proximal connecting part Cp. The support element 24 may be movable along the support element axis B1, . . . Bn in relation to the proximal connecting part Cp such that pre-tensioning of the biasing element 26 pulls the support element 24 in relation to the proximal connecting part Cp along the support element axis B1, . . . Bn, thereby exerting the compressive force on the intermediate housing part 20. The proximal connecting part Cp may in this exemplary embodiment comprise a ball joint having a through-hole through which the support element 24 may slide when biased by the biasing element 26.

Since there may be a considerable difference in electric potential between the first interface part 14 and the second interface part 28, the support element 24 may comprise an intermediate electrically insulating part 34, arranged between the distal connecting part Cd and the proximal connecting part Cp in order to avoid short-circuiting the tap changer housing 12 via the support element 24. The proximal connecting part Cp may also be provided with a dielectric shielding arrangement (not shown) for the same purpose.

The distal connecting part Cd may comprise an articulated connection mechanically connected to the second interface part 18. Similarly, the proximal connecting part Cp may comprise an articulated connection mechanically connected to either the first interface part 14 or arranged to be mechanically connected to a support structure 16 of a transformer tank (not shown). Articulated connections allow a degree of rotational movement around a point of connection. Thereby, bending stress on the support elements 24 at the proximal connecting part Cp and/or at the distal connecting part Cd is eliminated or reduced. The articulated connections may for instance comprise ball joints.

Figure 5:
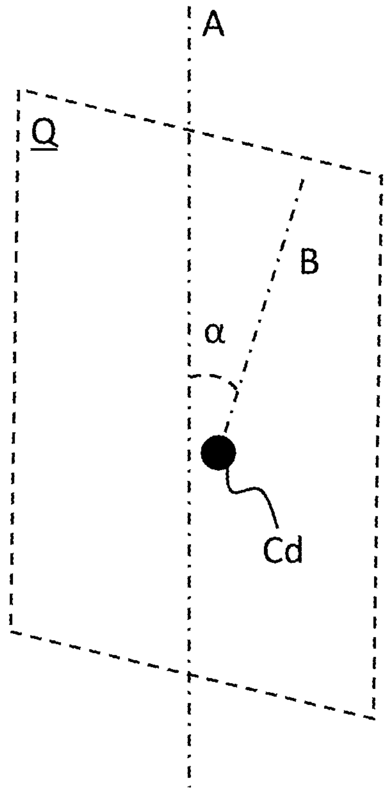
FIG. 5 is a perspective view of a plane defined according to an embodiment of the present disclosure.
Figure 6:
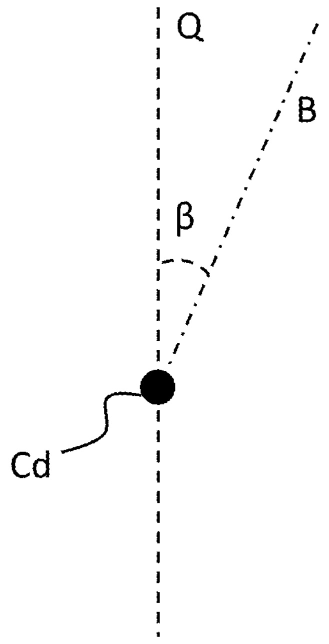
FIG. 6 is a view in parallel with the plane shown in FIG. 5.

FIG. 5 shows a further embodiment of the first aspect of the present disclosure. At least one support element 24 may be arranged to be inclined relative to a plane Q1, . . . On by a second angle β1, . . . βn between the plane Q1, . . . Qn and the support element axis B1, . . . Bn. The plane comprises the first axis A and the distal connecting part Cd of said at least one support element 24. FIG. 5 illustrates a perspective view of a such a plane Q comprising the first axis A and the distal connecting part Cd of a support element 24. A first angle α is also shown FIG. 6. FIG. 6 is a view in parallel with the plane Q and orthogonal to the first axis A, showing a second angle β between the plane Q and a support element axis B. The second angle β1, . . . βn is between −45 degrees and 45 degrees, preferably between −30 degrees and 30 degrees, and most preferably between −15 degrees and 15 degrees.

The second angle β1, . . . βn stabilizes the tap changer housing 12 and prevents or reduces rotational movement of the tap changer housing 12 around the first axis A. At least one second angle β1, . . . βn of one support element 24 may be complemented by at least one second angle β1, . . . βn of another support element 24 such that one support element 24 hinders rotation around the first axis A in one direction and the other support element 24 hinders rotation around the first axis A in the other direction.

Figure 7:
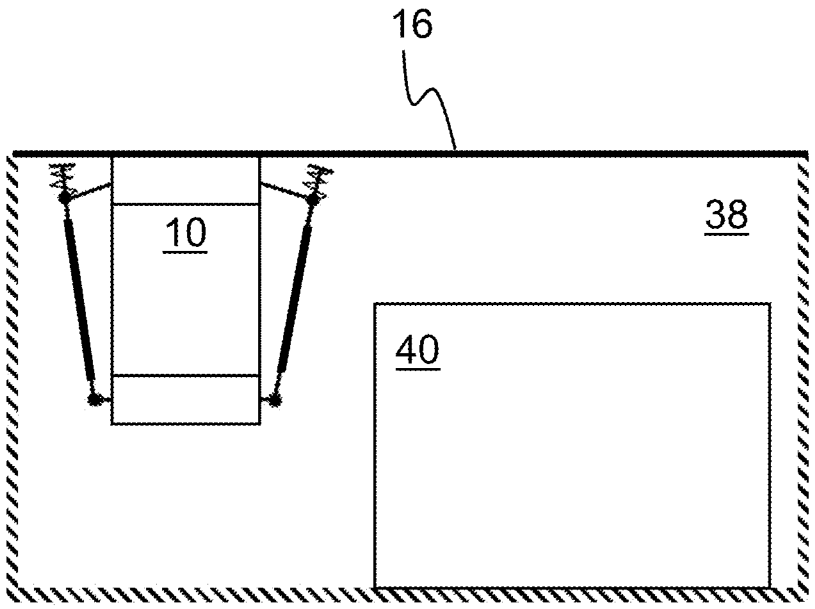
FIG. 7 is a cross-sectional concept view of the second aspect of the present disclosure.

FIG. 7 shows a transformer arrangement 36 according to the second aspect of the present disclosure. The transformer arrangement 36 comprises a transformer tank 38, a support structure 16, a transformer 40 and the tap changer arrangement 10 according to any one of the embodiments of the first aspect of the present disclosure. The support structure 16 may comprise at least a part of the transformer tank 38 enclosing the transformer and the tap changer arrangement 10. The support structure 16 may comprise a transformer tank cover 16.

The transformer tank 38 may be filled with insulating fluid. The transformer comprises a plurality of windings, such as primary and secondary windings (not shown), positioned on a floor space of the transformer tank, as conceptually shown in FIG. 7. The tap changer arrangement 10 according to the first aspect of the present disclosure may be suspended from a top of the transformer tank 38, e.g., from a transformer tank cover 16.

The invention claimed is:

1. A tap changer arrangement comprising a tap changer housing having a longitudinal extension along a first axis, which the tap changer housing comprises:

a first interface part, at a proximal part of the tap changer housing, fixedly attachable to a support structure of a transformer tank, a second interface part at a distal part of the tap changer housing, and an intermediate housing part arranged between the first interface part and the second interface part, the first interface part, the intermediate housing part and the second interface part being arranged on the first axis, wherein the tap changer housing is arranged to be suspended from the support structure of a transformer tank by the first interface part of the tap changer housing, wherein the tap changer arrangement comprises a plurality of support elements, each having a longitudinal extension along a respective support element axis, whereby each of the plurality of support elements is i) mechanically connected to the second interface part and ii) either mechanically connected to the first interface part or arranged to be mechanically connected to the support structure of the transformer tank, the plurality of support elements being distinct elements, separate from the intermediate housing part, and configured to exert a compressive force on the intermediate housing part from the first interface part and from the second interface part such that the intermediate housing part is pre-tensioned between the first interface part and the second interface part, wherein at least one of the plurality of support elements is arranged to be inclined relative to the first axis by a first angle between the first axis and the support element axis, wherein the first angle is between-45 degrees and 45 degrees but not at a vertical orientation of 0 degrees.

2. The tap changer arrangement according to claim 1, wherein at least one of the plurality of support elements is arranged to be inclined relative to the first axis by a first angle between the first axis and the support element axis.

3. The tap changer arrangement according to claim 2, wherein the plurality of support elements comprise a mechanical tensioning mechanism such that the support elements exert the compressive force on the intermediate housing part when the support elements are mechanically connected to the tap changer housing.

4. The tap changer arrangement according to claim 1, wherein the support elements each have a distal end comprising a distal connecting part and a proximal end comprising a proximal connecting part.

5. The tap changer arrangement according to claim 4, wherein the distal connecting part and/or the proximal connecting part comprises a biasing element arranged to exert the compressive force on the intermediate housing part, or arranged to exert an additional compressive force on the intermediate housing part.

6. The tap changer arrangement according to claim 5, wherein the biasing element is a coil spring.

7. The tap changer arrangement according to claim 4, wherein each of the support elements comprises an intermediate electrically insulating part, arranged between the distal connecting part and the proximal connecting part.

8. The tap changer arrangement according to claim 4, wherein the distal connecting part comprises an articulated connection mechanically connected to the second interface part and/or the proximal connecting part comprises an articulated connection mechanically connected to either the first interface part or arranged to be mechanically connected to the support structure of the transformer tank.

9. The tap changer arrangement according to claim 4, wherein at least one of the plurality of support elements is further arranged to be inclined relative to a plane by a second angle between the plane and the support element axis, which plane comprises the first axis and the distal connecting part (Cd) of said at least one support element, and wherein the second angle is between-45 degrees and 45 degrees.

10. The tap changer arrangement according to claim 1, wherein the intermediate housing part comprises an electrically insulating housing.

11. A transformer arrangement comprising the transformer tank, the support structure, a transformer and the tap changer arrangement according to claim 1.

12. The transformer arrangement according to claim 11, wherein the support structure comprises at least a part of the transformer tank, enclosing the transformer and the tap changer arrangement.

13. The transformer arrangement according to claim 11, wherein the support structure is a transformer tank cover.

* * * * *